United States Patent [19]

Barn

[11] Patent Number: 4,809,148
[45] Date of Patent: Feb. 28, 1989

[54] FULL-FLUXED, SINGLE-ENDED DC CONVERTER

[75] Inventor: Belwinder S. Barn, Burnaby, Canada

[73] Assignee: British Columbia Telephone Company, Burnaby, Canada

[21] Appl. No.: 111,035

[22] Filed: Oct. 21, 1987

[51] Int. Cl.$^4$ ............................................. H02M 3/335
[52] U.S. Cl. .......................................... 363/20; 363/56; 363/131
[58] Field of Search ..................... 363/20, 21, 56, 131; 323/272

[56] References Cited

U.S. PATENT DOCUMENTS

| | | | |
|---|---|---|---|
| 3,628,047 | 12/1971 | Cronin | 363/56 |
| 4,675,796 | 6/1987 | Gautherin et al. | 363/20 |
| 4,736,285 | 4/1988 | Cohen | 363/20 |
| 4,760,512 | 7/1988 | Loftus | 363/131 |

*Primary Examiner*—Patrick R. Salce
*Assistant Examiner*—Jeffrey Sterrett
*Attorney, Agent, or Firm*—Christensen, O'Connor, Johnson & Kindness

[57] ABSTRACT

A full-fluxed, single-ended, DC converter is disclosed. The converter includes a transformer having primary and secondary windings magnetically coupled and wound about a common core. A regulation switch is connected in series with the primary winding and allows the primary current to be interrupted in a time-controlled fashion, causing the desired output characteristics to be achieved. The series combination of a storage capacitor and reset switch are provided in parallel with the regulation switch to initiate bidirectional magnetizing current flow in the primary winding and, hence, bidirectional flux excursions in the transformer core. As a result, power transfer characteristics are improved. In the preferred embodiment, the regulation and reset switches are complementary field effect transistors (FETs) whose sources and gates are tied together allowing their gates to be coupled to a single bipolar drive signal. The resulting configuration allows full-fluxed operation to be achieved in a simple manner ensuring complementary operation of the switches.

11 Claims, 4 Drawing Sheets

Fig. 7.
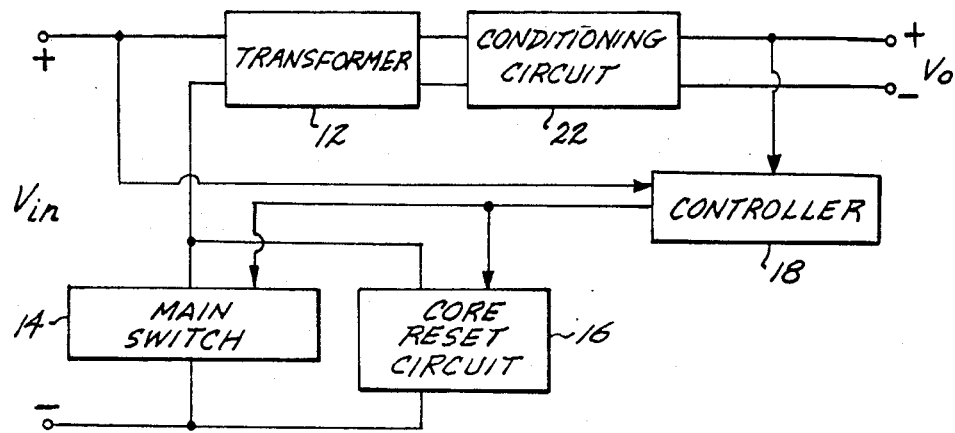
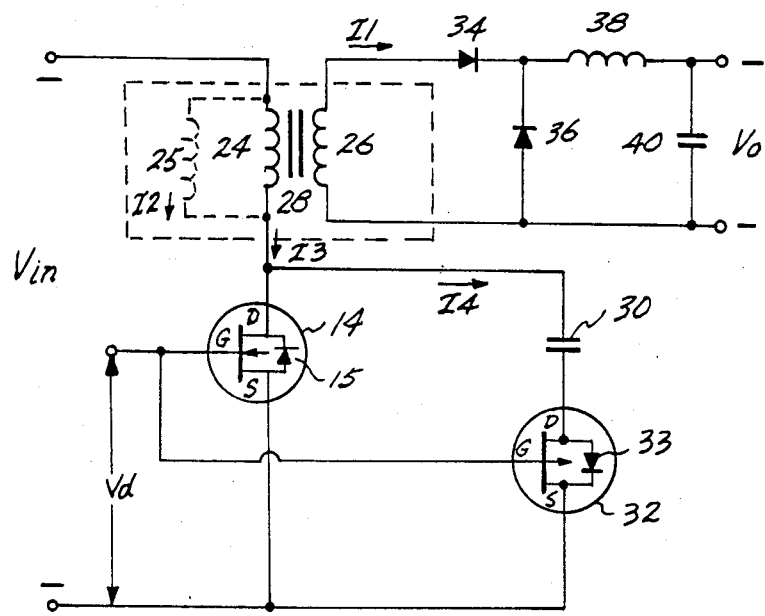
Fig. 8.

FULL-FLUXED, SINGLE-ENDED DC CONVERTER

FIELD OF THE INVENTION

This invention relates generally to single-ended, direct current (DC) converters and, more particularly, to single-ended, forward, DC converters.

BACKGROUND OF THE INVENTION

A DC converter is a device that converts an unregulated source of DC electrical energy into a source of constant DC voltage or current. The converter typically includes a transformer, having primary and secondary windings wound around a common magnetic core. The current or voltage applied to the primary winding is increased or decreased by the transformer in proportion to the ratio between the number of turns included in the primary and secondary windings. Regulation of the output voltage is achieved with the aid of a controlled switch or switches connected in the primary circuit. More particularly, by opening and closing the primary circuit for appropriate intervals, precise control over the energy transfer between primary and secondary is accomplished. For example, where an increase in the voltage or current at the output is required, the interval during which the primary is conducting can be increased. On the other hand, relatively long interruptions in the flow of current through the primary winding result in lower voltages or currents at the output.

Although a number of different DC converter constructions or topologies exist, the basic arrangement of interest, shown in FIG. 1 without a core discharging circuit, is commonly known as a single-ended, forward, DC converter. The single-ended designation indicates that power flow in the primary winding of the converter transformer is gated by one active device. In the traditional single-ended construction shown in FIG. 1, such a converter exercises the transformer over only one-half of its magnetization or B-H curve, where B and H equal the flux density and magnetic field intensity, respectively, in the core.

In comparison, a push-pull arrangement employs two active devices to conduct current through the primary winding during alternative half cycles. The two switches operate in opposite phase with respect to each other and the output of the arrangement is regulated using duty control. Such an arrangement exercises the transformer core over its entire magnetization curve, producing flux in the core having both positive and negative values. Disadvantages of this construction, however, are that the switches may cross-conduct and the core may "walk" into saturation.

The forward designation indicates that the primary and secondary windings of the transformer are simultaneously connected to the voltage source and load, respectively. As a result, when the primary winding is closed, energy is transferred "forward" through the transformer, from primary to secondary.

Addressing now the construction and operation of a basic single-ended, forward, DC converter, as shown in FIG. 1 it includes a transformer T having a primary winding P that is magnetically coupled to a secondary winding S by a magnetic core M. An input voltage source $V_{in}$ is applied to the series combination of the transformer primary P and a controlled, main switch SW1. An AC rectifier and filter circuit, including rectifier diodes RD1 and RD2, filter inductor FL, and filter capacitor FC, is coupled across the secondary winding S. As suggested previously, by opening and closing switch SW1 for appropriate intervals, the unregulated source $V_{in}$ can be converted to the desired regulated output $V_o$.

As will be appreciated, a "magnetizing" component of the current in the primary winding P furnishes the magnetomotive force required to overcome the magnetic reluctance of the core M. This magnetizing current causes energy to be stored in the transformer core M when the main switch SW1 is closed. When switch SW1 opens, the core must be reset by discharging the stored energy.

Numerous ways of discharging the core energy in single-ended, forward, DC converters have been developed. Traditionally, a demagnetizing winding DM has been employed as shown in FIG. 2. The demagnetizing winding DM has a polarity that is inverted with respect to the primary and secondary windings P and S of transformer T and is connected in series with a blocking diode D across the series combination of primary winding P and main switch SW1. Operation of demagnetizing winding DM is as follows.

With the switch SW1 closed, the source voltage $V_{in}$ is applied across the primary winding P of transformer T. During this interval, energy is stored in the transformer core M as a result of the magnetizing current flowing in the primary winding P. Because diode D is reverse biased, it blocks the flow of current through the demagnetizing winding DM. Once switch SW1 is opened, the current in the primary winding P is interrupted. At this time, the diode D becomes forward biased and the transformer core M is reset, or discharged, as the magnetic energy stored in the core M induces a current in the demagnetizing winding DM.

Assume a one-to-one turn ratio between the primary and demagnetizing windings P and DM. The current in the demagnetizing winding DM is initially equal to the peak value of the magnetizing current and decreases linearly over time until the energy stored in the core has been returned to the voltage source. The reset interval is equal to the period during which the switch SW1 was closed. After the core M has been discharged, but prior to the reclosure of switch SW1, the current through the demagnetizing winding DM is equal to zero because the energy stored in the core has been discharged and because no current is induced by the voltage $V_{in}$ applied across the series combination of the demagnetizing winding DM and diode D.

While the circuit of FIG. 2 has improved converter efficiency by transferring energy from core M back to the source $V_{in}$ when the switch1 is open, it presents several problems. First, the use of a demagnetizing winding DM to discharge core M involves an inherent duty cycle limitation. More particularly, assuming a one-to-one ratio between the number of turns in the primary and demagnetizing windings P and DM, the period of time required to "charge" the core M is equal to the time required to "discharge" the core M. As a result, if all the energy is to be discharged from the transformer core M and converter failure avoided, the switch SW1 must be open during each cycle for at least as long as it is closed. This limits the maximum duty cycle achievable with a one-to-one turn ratio to 50%. While an increased duty cycle can be achieved by altering the turns ratio between the primary and demagnetizing windings P and DM, this approach has the disadvantage of producing higher voltage peaks across the switch SW1. As will be appreciated, a widely variable duty cycle is desirable because it allows the converter to regulate the voltage applied to a broad range of loads from a widely varying source.

An alternative method of resetting the core, which overcomes the duty cycle and voltage peak limitations of the demagnetizing winding arrangement shown in FIG. 2 is described in U.S. Pat. No. 4,441,146. As shown in FIG. 3, the particular circuit of interest disclosed by this reference is an adaptation of the single-ended, forward, DC converter illustrated in FIG. 1. More particularly, the series combination of a capacitor C and switch SW2 is placed in parallel with the primary winding P of transformer T. The operation of switch SW2 is controlled by a control circuit CC such that, when the main switch SW1 is open, the capacitor C is coupled to winding P to form a resonant circuit with the transformer's magnetizing inductance. This resonant circuit resets the magnetizing energy stored in the core M by creating a "mirror image" of the magnetic flux between the periods during which switch SW1 is closed. As a result, capacitor C, switch SW2 and control circuit CC are collectively referred to as a "magnetizing current mirror."

Addressing the operation of this magnetizing current mirror in slightly greater detail, reference is had to FIGS. 4, 5, and 6, in which the operation of switch SW1, the voltage $V_s$ across switch SW1 and the current $I_c$ through capacitor C, respectively, are illustrated as a function of time. The capacitance of capacitor C is sufficiently large to render the time dependence of the voltage $V_c$ across capacitor C negligible when switch SW2 is closed. As a result, the voltage $V_s$ across the open switch SW1 will be constant and the current $I_c$ flowing through capacitor C will rise linearly, as described below.

The operation depicted in FIGS. 4, 5, and 6 is for a 33% duty cycle in which primary switch SW1 is closed between times $t_1$ and $t_2$ and open between times $t_2$ and $t_4$. The control circuit CC operates in conjunction with switch SW1 to ensure that switch SW2 opens prior to the closing of switch S1 and closes after switch SW1 opens. As shown in FIG. 5, when switch SW1 is closed, the voltage $V_s$ across switch SW1 and the current $I_C$ through the second switch SW2 are both equal to zero. During this interval, the source voltage $V_{in}$ is applied to the primary winding P of transformer T, inducing a current flow in the secondary winding S and storing energy in the transformer core M. Once switch SW1 is opened, no current flows through it, and the associated closing of switch SW2 will cause the voltage across that switch to drop to zero. The voltage $V_s$ across switch SW1 is clamped to a value $V_p$ that is equal to the sum of the input voltage $V_{in}$ and the voltage $V_c$ across capacitor C1.

When switch SW1 is opened, magnetizing energy stored in the core M while switch SW1 was closed is transferred to capacitor C. Initially, the current $I_c$ flowing through capacitor C is negative in sign and equal to the peak magnetizing current $I_p$. During the interval defined by times $t_2$ and $t_3$, magnetizing current is transferred from the transformer T to capacitor C, charging the capacitor C. At time $t_3$, this magnetizing current vanishes. Then, between times $t_3$ and $t_4$, the stored magnetizing energy is transferred back from capacitor C to the transformer T. The process is complete at time $t_4$, when the magnetizing energy has been reflected back into the transformer T, resetting it. A wide range of duty cycles can be achieved by selecting the appropriate source voltage $V_{in}$ and capacitor C.

It is noted in U.S. Pat. No. 4,441,146 that the magnetizing current mirror described above not only advantageously recycles the core's magnetization energy, making use of the available flux swing, while minimizing voltage stress on the switch SW1 during the off period by avoiding dead time, but also eliminates constraints on the converter duty cycle. It is stated that the current mirror can be connected in parallel with either the primary or secondary winding P or S of the transformer T.

While the circuit of FIG. 3 does accomplish the desired resetting of core M without the disadvantages attributable to the use of the demagnetizing winding arrangement illustrated in FIG. 2, it is not without problems. For example, in a transistor implementation of switch SW2, the control signal applied to switch SW2 must be referenced to either the positive terminal of the unregulated source $V_{in}$ or the capacitor C. In addition, the application of separate control signals to the two switches SW1 and SW2 makes it difficult to ensure that both switches are not on simultaneously as is required for proper operation. Further, a fault in the control circuit CC could lead to the simultaneous closure of switches SW1 and SW2, preventing proper core discharge and leading to failure of the converter.

In light of the foregoing discussion, it would be desirable to produce a single-ended, forward, DC converter constructed to discharge transformer core energy without affecting control over the duty cycle of the converter, while simultaneously providing simple, effective control of the converter switching elements.

SUMMARY OF THE INVENTION

In accordance with this invention, a single-ended DC converter is provided, including a transformer having a core and magnetically coupleable primary and secondary windings wound about the core. A first controllable switch is connected in series with one of the windings. The series combination of a capacitor and second controllable switch is connected in parallel with the first controllable switch. With the converter appropriately connected between a voltage source and electric load, the first switch is controllably openable and closable to provide a desired regulation of energy transfer by the transformer between the source and load. The second switch, in combination with the capacitor, is controllably openable and closable to provide opposed magnetic flux excursions in the transformer core.

In accordance with another aspect of this invention, the series combination of a capacitor and second controllable switch is coupled to one of the windings and a controller is included to provide a single control signal to the first and second controllable switches to cause them to operate out-of-phase with respect to each other.

BRIEF DESCRIPTION OF THE DRAWINGS

FIG. 7 is a block diagram of a converter incorporating a circuit constructed in accordance with this invention to effect a discharge of the magnetizing energy in the transformer core;

FIG. 8 is a schematic diagram of the converter of FIG. 7;

DETAILED DESCRIPTION OF THE PREFERRED EMBODIMENT OF THE INVENTION

Figure 1:
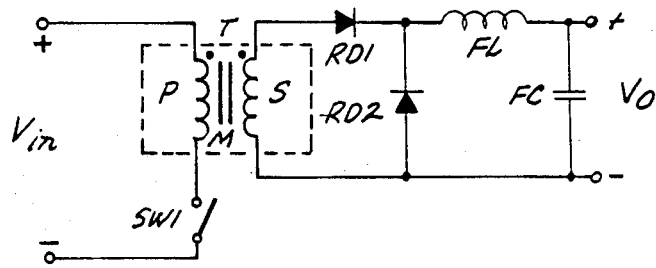
FIG. 1 is a schematic diagram of a conventional single-ended, forward, DC converter, including a transformer and a main switch connected in series with the primary winding of the transformer.
Figure 2:
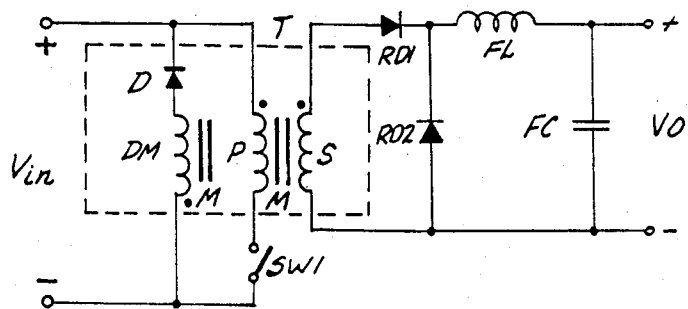
FIG. 2 is a schematic diagram of a conventional modification of the converter of FIG. 1, including a demagnetizing winding to reset or discharge the core of the transformer.

Referring now to FIG. 7, a single-ended, forward, DC converter 10 constructed in accordance with this invention is illustrated. The function of converter 10 is to convert an unregulated source of DC voltage or current into a regulated form suitable for application to a particular electric load. For example, as shown in FIG. 7, converter 10 receives an input voltage $V_{in}$ and produces a regulated output voltage $V_o$ in response thereto.

As shown in the block diagram of FIG. 7, converter 10 includes a number of basic elements. A transformer 12 provides the desired energy transformation characteristics in cooperation with a main switch 14. A core reset circuit 16 recycles energy. Control of the main switch 14 and core reset circuit 16 is effected by a controller 18 in response to load information received from $V_o$ and/or $V_{in}$. A conditioning circuit 22 conditions the output of transformer 12 for application to a load. The particular construction of the converter 10 depicted allows the desired energy conversion to be accomplished in an efficient straightforward manner.

Addressing now the elements of FIG. 7 in greater detail, reference is had to FIG. 8. As shown, transformer 12 includes a primary winding 24 and secondary winding 26 magnetically coupled and wound about a common core 28. For clarity, the magnetizing inductance 25 is also shown, in broken lines. The voltages across the primary and secondary windings 24 and 26 have like polarities as indicated by the polarity marks shown adjacent the windings in FIG. 8. The ratio between the number of turns in windings 24 and 26 is designated 1:n, where n equals the number of turns in secondary winding 26 corresponding to each turn of primary winding 24. By selecting the appropriate turns ratio, transformer 12 can be used to step the primary voltage or current up or down as required by the particular application for which converter 10 is employed.

In series with the primary winding 24 of transformer 12 is the main switch 14. The input source voltage $V_{in}$ is applied across the series combination of switch 14 and primary winding 24. As shown in the embodiment of FIG. 8, switch 14 is an n-channel field-effect transistor (FET), whose drain and source terminals are connected to the primary winding 24 and electric ground, respectively.

By selectively allowing FET 14 to conduct and block the flow of current through primary winding 24, the desired regulation of energy transfer to the secondary winding 26 can be achieved. Control of FET 14 is provided by the application of an external drive signal $V_d$ to the gate terminal of FET 14. As noted previously, a controller 18 placed in the circuit of the secondary winding 26 monitors the output, for example, $V_o$, of converter 10. This information is processed by controller 18, which provides the drive signal $V_d$ required to produce the desired output $V_o$.

Controller 18 is an analog circuit that monitors various operating conditions of the power supply. The controller 18 keeps the main switch 14 open if any abnormal conditions exist. It also forms the feedback part of the regulating loop, providing compensation for stability. Regulation is achieved as follows. If the present output $V_o$ is too high, the signal $V_d$ produced by controller 18 causes the FET 14 to remain inactive for a longer interval, decreasing the converter's duty cycle. On the other hand, if the output $V_o$ is below the desired level, the drive signal $V_d$ is adjusted to increase the duty cycle. As will be appreciated from FIG. 8, the drive signal $V_d$ is conveniently referenced to ground, eliminating the need to adjust the drive signal $V_d$ in response to fluctuations in the input voltage $V_{in}$ as would be required if the drive signal were referenced with respect to the positive input terminal.

In parallel with switch 14 is the core reset circuit 16, previously noted. As shown in FIG. 8, core reset circuit 16 includes a storage capacitor 30 connected in series with a reset switch 32. Diodes 15 and 33 are placed in parallel with switches 14 and 32 and are necessary for circuit operation, particularly when both switches 14 and 32 are open during the switching transition. The diodes 15 and 33 are required due to the finite switching times of nonideal or "real" switches. With MOSFETs employed as switches 14 and 32, as shown in FIG. 8, the parasitic body diodes in the MOSFETs serve as diodes 15 and 33. Capacitor 30 and reset switch 32 effectively cooperate to reset the magnetizing energy stored in transformer core 28 while switch 14 is closed by temporarily storing it when switch 14 opens and then returning it to the input source $V_{in}$. The capacitance of storage capacitor 30 should be sufficiently great to render the time dependence of the voltage across capacitor 30 negligible for a particular state of switches 14 and 32. As a result, the voltage across the main switch 14 will remain substantially constant and the current through the coil 24 will vary linearly when switch 14 is open.

The reset switch 32, as shown in FIG. 8, is preferably a p-channel FET. As shown, the source terminal of switch 32, like that of switch 14, is connected to ground, allowing the gate terminal of each device to be driven by a common drive signal source $V_d$. Given the complementary n-channel and p-channel construction of FETs 14 and 32, their connection to a single drive signal $V_d$ ensures that when switch 14 is on, or conducting, switch 32 will be off, or open. Conversely, when switch 32 is closed, switch 14 will be open. As a result, the complementary switches 14 and 32 operate out-of-phase with respect to each other. The drive signal $V_d$ is bipolar, taking on positive and negative values with respect to the common source connection of switches 14 and 32. Neither a floating gate drive circuit nor additional controlling circuitry is required.

As shown in FIG. 8, the conditioning circuit 22 connected to secondary winding 26 in FIG. 7 is preferably an AC rectifier and filter 46, including rectification diodes 34 and 36, a filter inductor 38, and filter capacitor 40. As noted previously, controller 18 would likely also be included in the output circuit to detect the output level, providing the information necessary to effect the drive signal $V_d$ duty cycle adjustments required to produce the desired output characteristics.

Addressing now the operation of the converter illustrated in FIG. 8, reference is had to the waveforms illustrated in FIGS. 9, 10, 11 and 12. It is assumed, for the purpose of illustration, that the inductance of the filter inductor 38 is much larger than the magnetizing inductance 25 of the transformer 12. In addition, the transformer turn ratio is arbitrarily set at 1:1.

Figure 9:
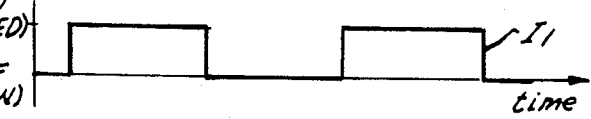
FIG. 9 is a waveform illustrating both the operation of the main switch and the current flowing in the secondary winding of the converter of FIG. 8.

The waveform depicted in FIG. 9 illustrates a number of consecutive open and closed intervals of the main switch 14, produced in response to corresponding duty cycle variations in the drive signal $V_d$. Given the placement of the input voltage $V_{in}$ across the series combination of the primary winding 24 and regulation switch 14, each time switch 14 is closed a current I1 flows in the secondary winding 26, as shown in FIG. 9. The magnetic coupling of the primary and secondary windings 24 and 26 causes a corresponding current to be induced in the primary winding 24 and magnetizing current also flows in the magnetizing inductance 25. As will be appreciated, the secondary current I1 has a substantially constant, nonzero value when switch 14 is closed and drops to zero when switch 14 is open.

Figure 10:
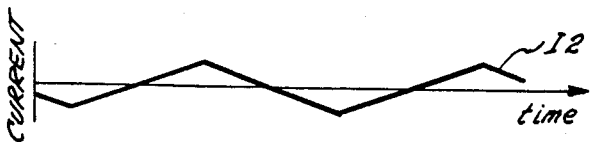
FIG. 10 is a waveform depicting the magnetizing current flowing in the primary winding of the converter of FIG. 8.

FIG. 10 depicts the magnetizing current I2 flowing in the primary winding 24. As noted previously, current I2 is the component of the primary current that is required to overcome the magnetic reluctance of core 28. As shown in FIG. 10, the magnetizing current I2 varies linearly between negative and positive peaks, increasing in magnitude during the interval in which switch 14 is closed and energy is stored in core 28 and decreasing in magnitude when switch 14 is open.

Figure 11:
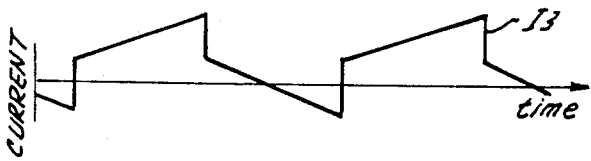
FIG. 11 is a waveform representing the entire current flowing in the primary winding of the converter of FIG. 8.

The entire current in primary winding 18, designated I3, is illustrated in FIG. 11. As will be appreciated, current I3 is essentially a summation of the magnetizing current I2 and some component having a substantially constant magnitude when switch 14 is closed that corresponds to the time-dependent nature of the secondary winding current I1.

Figure 12:
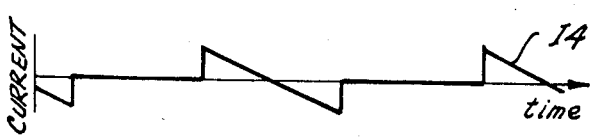
FIG. 12 is a waveform representing the current flowing through the series combination of a capacitor and a second switch connected in parallel with the first main switch of FIG. 8.

FIG. 12 depicts the current I4 flowing through the series combination of storage capacitor 30 and reset switch 32. As shown, this current is equal to zero during the intervals in which switch 32 is open and not conducting. When switch 32 closes, however, switch 14 is open and the magnetizing current I2 flows through the capacitor 30 and reset switch 32.

As these waveforms illustrate, the energy stored in the magnetizing inductance of transformer 12 when switch 14 is closed must discharge into capacitor 30 when switch 14 is open. Because capacitor 30 cannot discharge through switch 14, the stored energy is necessarily directed back to the series combination of the primary winding 24 and the source $V_{in}$. The net charge into capacitor 30 is equal to the net charge out. As a result, the current in the magnetizing inductance is bidirectional, as are the flux excursions in the core 28. The equilibrium voltage across the capacitor is determined by both the input voltage $V_{in}$ and the duty cycle.

Full-fluxed operation of the core 28 in the manner described above is achieved without restricting the duty cycle of the converter 10. The power characteristics of converter 10, where power handling is limited by the permissible flux density in the core 28 is significantly improved in comparison to the conventional single-ended design. More particularly, the core of a standard single-ended converter is operated over a range of flux densities extending between zero and some maximum $B_{max}$. Assuming the efficiency of the converter is 100%, the input and transmitted powers are the same and equal to the product of $V_{in}$ and $I_{in}$ where $I_{in}$ is the current in the primary winding of the transformer. Because the full-fluxed design operates the core over a flux range extending from $-B_{max}$ to $+B_{max}$, the input voltage $V_{in}$ can be twice as large before the flux density sweeps this range. If the input current is unchanged, leaving the transformer operating at the same current density, the input power and transmitted power would then be equal to twice the product of $V_{in}$ and $I_{in}$.

Figure 3:
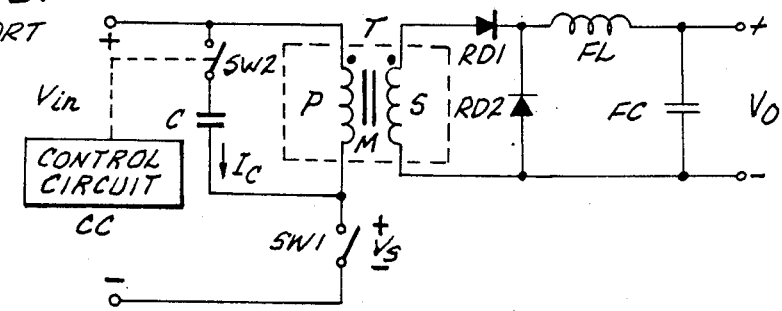
FIG. 3 is a schematic diagram of another conventional modification of the converter of FIG. 1 that discharges or resets the transformer core.
Figure 4:
FIG. 4 is a waveform illustrating the operation of the main switch of the converter shown in FIG. 3.
Figure 5:
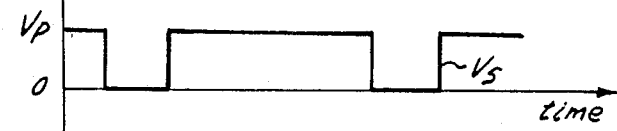
FIG. 5 is a waveform illustrating the voltage across the main switch of the converter shown in FIG. 3.
Figure 6:
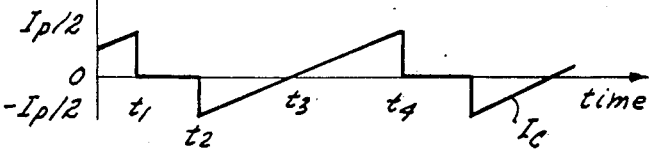
FIG. 6 is a waveform depicting the current flowing through the series combination of a second switch and a capacitor connected in parallel with the primary winding of the converter shown in FIG. 3.

In addition to these advantages, the converter construction shown in FIGS. 7 and 8 has a number of advantages over the prior art full-fluxed configuration illustrated in FIG. 3. More particularly, if an FET embodiment of the circuit of FIG. 3 were employed, separate control signals would be required to operate the two switches. As a result, it would be difficult to ensure the complementary operation of the two switches that is required to prevent both switches from being closed at the same time. In the construction shown in FIGS. 7 and 8, the common connection of the source and gate terminals of FETs 14 and 26 allows a single, commonly referenced, gate control signal to be employed, ensuring complementary operation of the two switches. As a result, core discharge is ensured, reducing the likelihood of a converter failure.

Another advantage of the construction shown in FIGS. 7 and 8 is that the drive signal $V_d$ applied to the gate terminal of FET 32 can be conveniently referenced to ground. This is to be contrasted to the arrangement of FIG. 3, where the drive signal applied to SW2 is not referenced to a fixed level.

Figure 13:
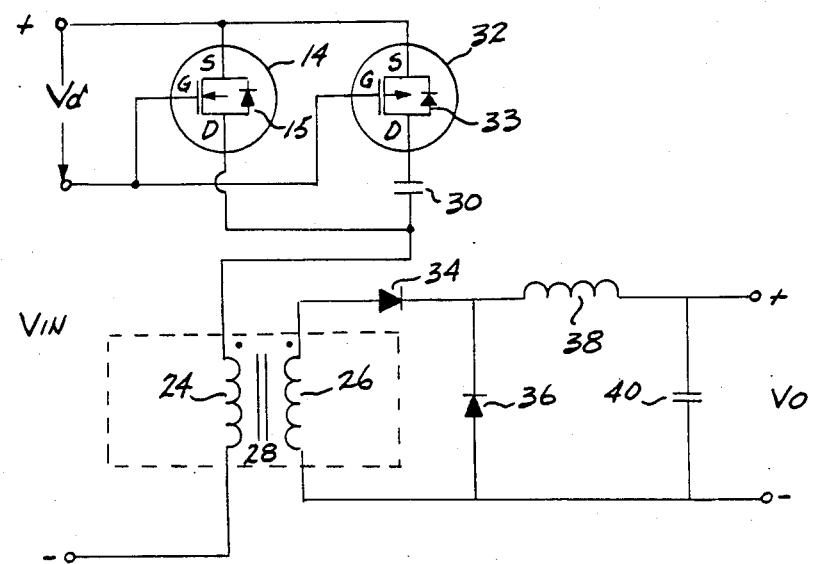
FIG. 13 is a schematic diagram illustrating an alternative embodiment of the circuit illustrated in FIG. 8.

FIG. 13 illustrates an alternative embodiment of a full-fluxed, single-ended, DC converter constructed in accordance with this invention. As will be appreciated, like components are designated with like letters and reference numerals. The function of core reset circuit 16 remains to reset the core 28 by storing and returning the magnetizing energy of the core 28 in controlled fashion. Switch 14 is a p-channel device, while switch 32 is an n-channel device. The capacitor 30 is still connected to the drain of switch 32. The operation of this circuit is identical to that of the circuit shown in FIG. 8, except that there is a phase reversal from the drive signal $V_d$ to the voltage at the junction of the two output diodes 34 and 36.

Those skilled in the art will recognize that the embodiments of the invention disclosed herein are exemplary in nature and that various changes can be made therein without departing from the scope and spirit of the invention. In this regard, the invention is readily embodied with a switched energy storage device located in series with either the primary or secondary winding of the transformer. Because of the above and numerous variations and modifications that will occur to those skilled in the art, the following claims should not be limited to the embodiments illustrated and discussed herein.

The embodiments of the invention in which an exclusive property or privilege is claimed are defined as follows:

1. A single-ended DC converter comprising:
   a transformer having a core and magnetically coupleable primary and secondary windings wound about said core;
   a first controllable switch connected in series with one of said windings; and
   a series combination of a capacitor and a second controllable switch connected in parallel with said first controllable switch for allowing bidirectional magnetic flux excursions to be produced in said core.

2. The converter of claim 1, wherein said one of said windings is said primary winding.

3. The converter of claim 2, wherein said first and second controllable switches are complementary field-effect transistors whose source terminals are connected together and whose gate terminals are connected together.

4. The converter of claim 1, further comprising control means for controlling said first and second controllable switches.

5. A single-ended, DC converter for converting unregulated input energy into a regulated output, said converter comprising:
   a transformer having a core and magnetically coupleable primary and secondary windings wound about said core;
   a first controllable switch connected in series with one of said windings; and
   a series combination of a capacitor and a second controllable switch connected in series with one of said windings for allowing bidirectional magnetic flux excursions to be produced in said core.

6. The converter of claim 5, wherein said one of said windings that said first controllable switch is connected to is said primary winding.

7. The converter of claim 6, wherein said one of said windings that said series combination is connected to is said primary winding.

8. The converter of claim 7, wherein said first controllable switch and said series combination are connected in parallel.

9. The converter of claim 5, wherein said first and second controllable switches are complementary field-effect transistors whose source terminals are connected together and whose gate terminals are connected together.

10. The converter of claim 5, further comprising control means for controlling said first and second controllable switches to produce said regulated output.

11. A single-ended DC converter comprising:
    a transformer having a core and magnetically coupleable primary and secondary windings wound about said core;
    a first controllable switch connected in series with one of said windings;
    a series combination of a capacitor and a second controllable switch coupled to one of said windings for allowing bidirectional magnetic flux excursions to be produced in said core; and
    control means for providing a single control signal to said first and second controllable switches to cause said first and second controllable switches to operate out-of-phase with respect to each other.

* * * * *